(12) United States Patent
Virupaksha et al.

(10) Patent No.: US 10,065,468 B2
(45) Date of Patent: Sep. 4, 2018

(54) ATTACHMENT PLATE AND TOWING LUG COMBINATION FOR A COMPOSITE BUMPER BEAM AND COMPOSITE CRUSH CAN ASSEMBLY

(71) Applicant: GM GLOBAL TECHNOLOGY OPERATIONS LLC, Detroit, MI (US)

(72) Inventors: Vinayshankar L. Virupaksha, Troy, MI (US); Stuart J. Brown, Flint, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 42 days.

(21) Appl. No.: 15/136,120

(22) Filed: Apr. 22, 2016

(65) Prior Publication Data

US 2017/0305220 A1    Oct. 26, 2017

(51) Int. Cl.
| | | |
|---|---|---|
| *B60D 1/56* | (2006.01) | |
| *B60R 19/48* | (2006.01) | |
| *B60R 19/34* | (2006.01) | |
| *B60R 19/02* | (2006.01) | |

(52) U.S. Cl.
CPC ............. *B60D 1/56* (2013.01); *B60R 19/34* (2013.01); *B60R 19/48* (2013.01); *B60R 19/023* (2013.01)

(58) Field of Classification Search
CPC .......... B60D 1/56; B60D 19/34; B60D 19/48; B60D 19/023

USPC ......................................................... 280/505
See application file for complete search history.

(56) References Cited

U.S. PATENT DOCUMENTS

| | | | | |
|---|---|---|---|---|
| 8,419,040 B2* | 4/2013 | Ando | ........................ | B60D 1/04 280/491.5 |
| 8,550,498 B2* | 10/2013 | Klimek | ................... | B60D 1/485 280/784 |
| 8,820,804 B2* | 9/2014 | Shibata | ................... | B60R 19/18 293/117 |
| 9,669,785 B2* | 6/2017 | Holmstrom | ........... | B60R 19/023 |
| 2004/0207217 A1* | 10/2004 | Muller | ................... | B60D 1/488 293/133 |
| 2015/0298633 A1* | 10/2015 | Winberg | .............. | B62D 21/152 296/187.09 |

* cited by examiner

*Primary Examiner* — Anne Marie M Boehler
*Assistant Examiner* — Felicia L. Brittman
(74) *Attorney, Agent, or Firm* — Quinn IP Law

(57) ABSTRACT

An attachment plate and towing lug combination for a vehicle having a crush can and a bumper beam includes a plate and a towing lug. The plate has a central portion and a flange portion. The towing lug is attached to the central portion of the plate and extends from an outer surface of the central portion of the plate. The flange portion of the plate is attachable to an end portion of the crush can. The central portion of the plate is attachable to a first side portion of the bumper beam. The towing lug extends to at least an outer surface of a second side portion of the bumper beam when the flange portion of the plate is attached to the end portion of the crush can and the central portion of the plate is attached to the first side portion of the bumper beam.

18 Claims, 3 Drawing Sheets

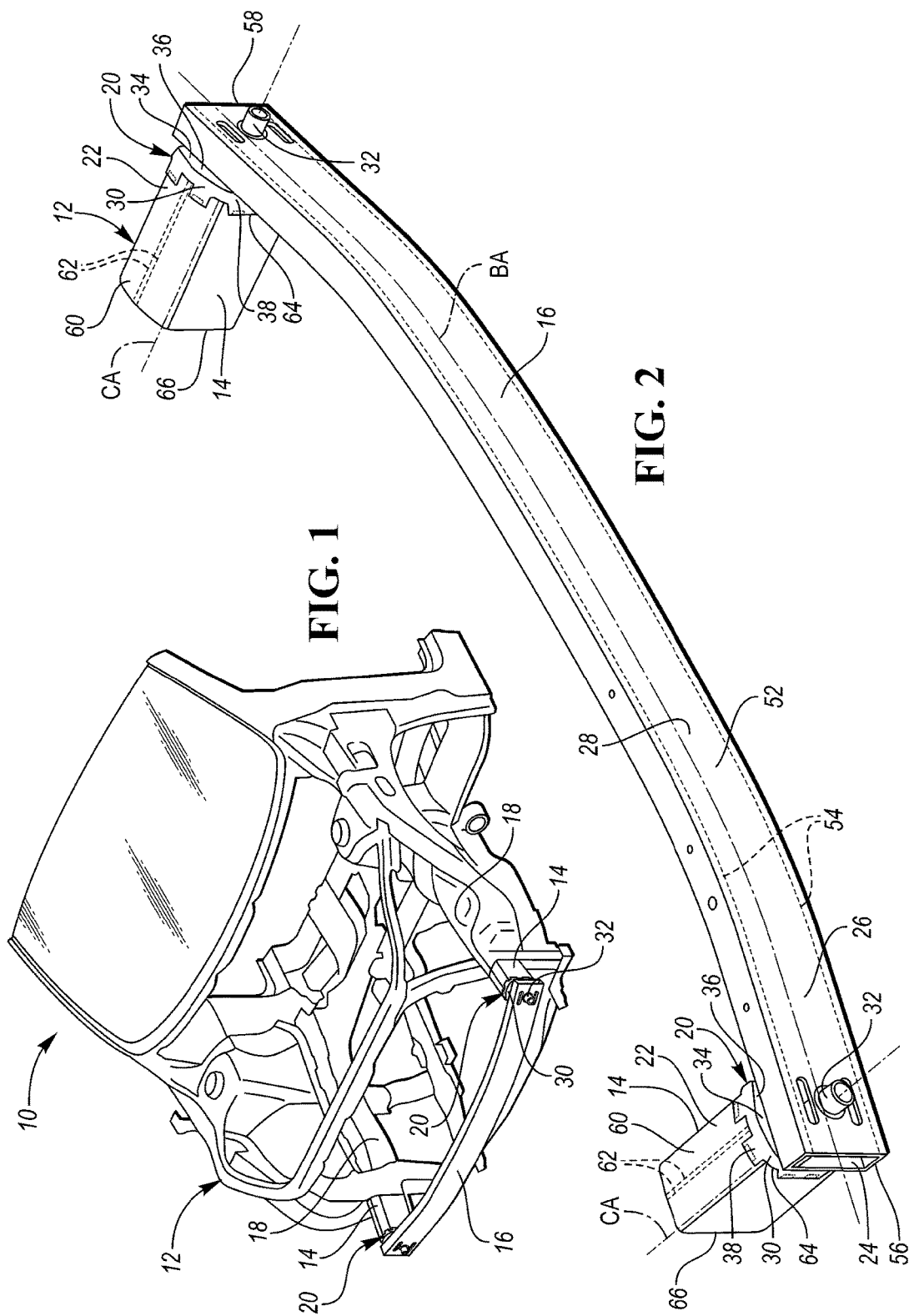

ATTACHMENT PLATE AND TOWING LUG COMBINATION FOR A COMPOSITE BUMPER BEAM AND COMPOSITE CRUSH CAN ASSEMBLY

TECHNICAL FIELD

This disclosure relates to an attachment plate and towing lug combination for a composite bumper beam and composite crush can assembly.

BACKGROUND

A vehicle typically includes a body structure having a bumper beam attached to a crush can. The body structure may also have a towing lug for attaching a towing hook to the body structure. The towing hook is for towing the vehicle or for securing the vehicle during transport of the vehicle on a transport vehicle such as a truck, a train, a boat, etc. The bumper beam and the crush can may be made of fiber reinforced polymer or plastic composite materials.

SUMMARY

An attachment plate and towing lug combination and a vehicle are disclosed herein. The attachment plate and towing lug combination is for a vehicle having a body structure including a crush can having an end portion and a bumper beam having a first side portion and a second side portion including an outer surface. The attachment plate and towing lug combination includes a plate and a towing lug. The plate has a central portion including an outer surface. The plate also has a flange portion. The towing lug is attached to the central portion of the plate and extends from the outer surface of the central portion of the plate. The flange portion of the plate is attachable to the end portion of the crush can. The central portion of the plate is attachable to the first side portion of the bumper beam. The towing lug extends to at least the outer surface of the second side portion of the bumper beam when the flange portion of the plate is attached to the end portion of the crush can and the central portion of the plate is attached to the first side portion of the bumper beam. The bumper beam may be made of a first fiber reinforced plastic composite material and the crush can may be made of a second fiber reinforced plastic composite material.

The vehicle has a body structure including a crush can, a bumper beam, and an attachment plate and towing lug combination. The crush can has an end portion. The bumper beam has a first side portion and a second side portion including an outer surface. The attachment plate and towing lug combination includes a plate and a towing lug. The plate has a central portion including an outer surface. The plate also has a flange portion. The towing lug is attached to the central portion of the plate and extends from the outer surface of the central portion of the plate. The flange portion of the plate is attached to the end portion of the crush can. The central portion of the plate is attached to the first side portion of the bumper beam. The towing lug extends to at least the outer surface of the second side portion of the bumper beam.

The attachment plate and towing lug combination and the vehicle disclosed herein attaches the bumper beam of the body structure to the crush can of the body structure and also attaches the towing lug to the bumper beam and crush can assembly to enable attachment of a tow hook to the body structure. This disclosure applies to any vehicle, including but not limited to cars, trucks, vans, all-terrain vehicles, busses, boats, trains, airplanes, manufacturing vehicles and equipment, construction vehicles and equipment, maintenance vehicles and equipment, military vehicles and equipment, etc.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 1 is a fragmentary, schematic, perspective illustration of a vehicle having a body structure including a bumper beam attached to a crush can via an attachment plate and towing lug combination.

FIG. 2 is a schematic, perspective illustration of the bumper beam attached to the crush can via the attachment plate and towing lug combination of FIG. 1.

DETAILED DESCRIPTION

Figure 3:
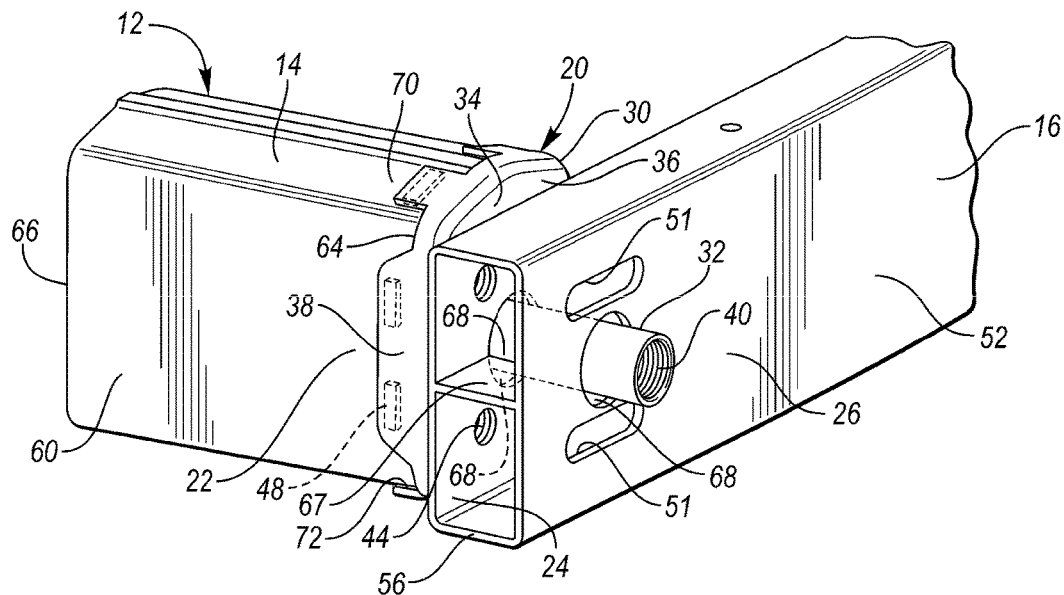
FIG. 3 is a schematic, perspective illustration of the attachment plate and towing lug combination of FIG. 1 attached to the crush can with the bumper beam positioned for attachment to the crush can via the attachment plate and towing lug combination.

Those having ordinary skill in the art will recognize that terms such as "above," "below," "upward," "downward," "top," "bottom," etc., are used descriptively for the figures, and do not represent limitations on the scope of the disclosure, as defined by the appended claims.

Referring to the drawings, wherein like reference numbers refer to like components throughout the views, FIG. 1 shows a portion of an example vehicle 10. The vehicle 10 includes an attachment plate and towing lug combination 20 of the type disclosed herein. While the vehicle 10 of FIG. 1 is a typical example application suitable for the attachment plate and towing lug combination 20 disclosed herein, the present design is not limited to vehicular applications. Any stationary or mobile, machine or manufacture may benefit from use of the present design, when properly scaled and configured for the particular application. For illustrative consistency, the vehicle 10 will be described hereinafter as an example system without limiting use of the attachment plate and towing lug combination 20 to such an embodiment.

Referring now to FIGS. 1-3, the vehicle 10 has a body structure 12. The body structure 12 includes a crush can 14, a bumper beam 16, and the attachment plate and towing lug combination 20. The crush can 14, the bumper beam 16, and the attachment plate and towing lug combination 20 may be located at a front end of the body structure 12 of the vehicle 10, as shown. Alternatively, the crush can 14, the bumper beam 16, and the attachment plate and towing lug combination 20 may be located at a rear end of the body structure 12 of the vehicle 10.

The body structure 12 may include a rail 18. The crush can 14 may be attached to the rail 18. Alternatively, the crush can 14 may be a portion of the rail 18 adjacent to the bumper beam 16. The crush can 14 may be configured to absorb energy when the vehicle 10 is subjected to an external force (not shown). The bumper beam 16 may be configured to receive the external force and to distribute the external force to one or more crush cans 14. The crush can 14 has an end portion 22, proximate to the bumper beam 16. The bumper beam 16 has a first side portion 24, proximate to the end portion 22 of the crush can 14, and a second side portion 26 including an outer surface 28.

Figure 4:
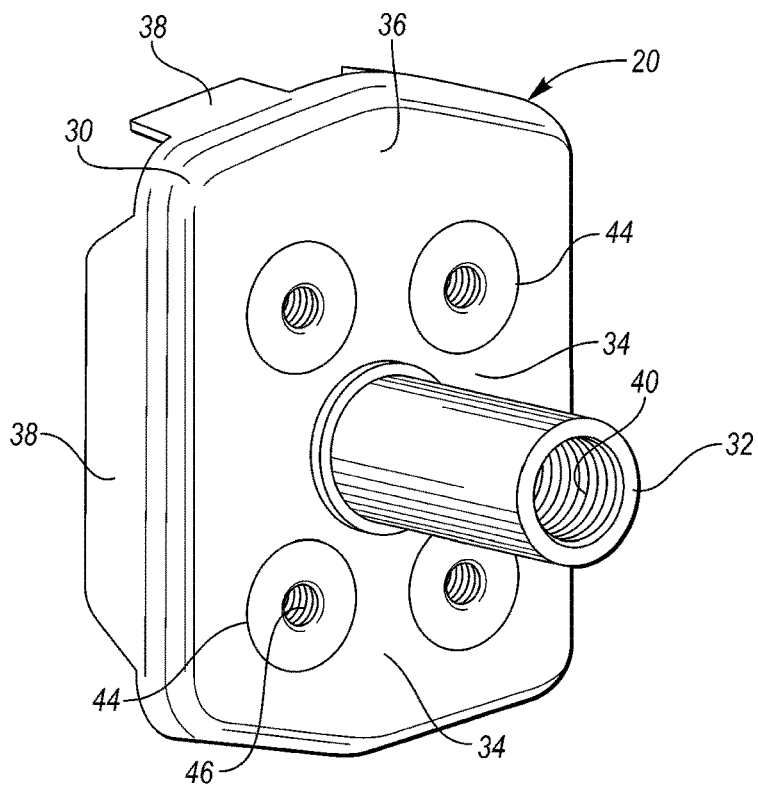
FIG. 4 is a schematic, perspective illustration of the attachment plate and towing lug combination of FIG. 1.
Figure 5:
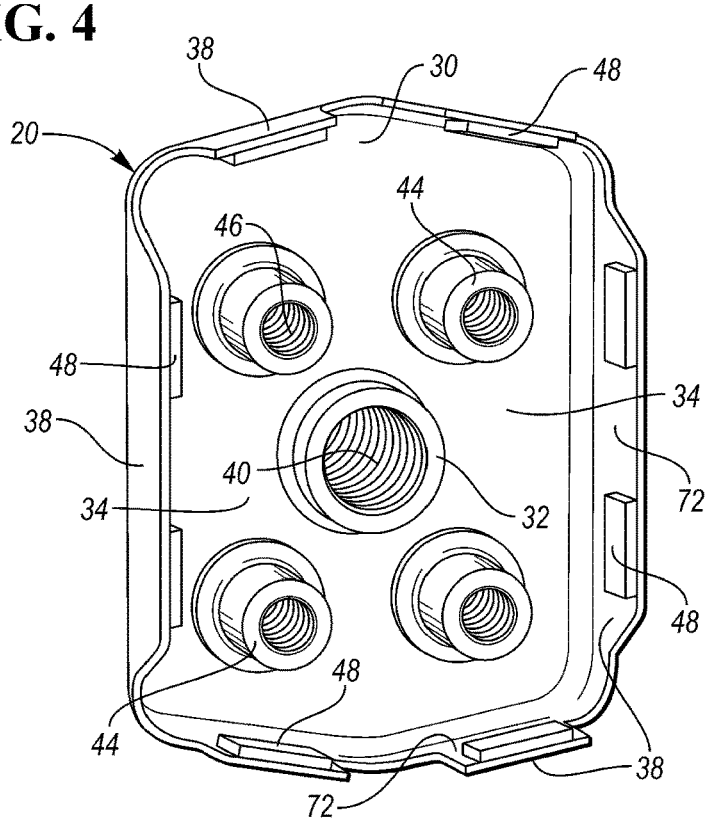
FIG. 5 is a schematic, perspective illustration of the attachment plate and towing lug combination of FIG. 1, viewed from the opposite side of the view of FIG. 4.

Referring now to FIGS. 4-5, the attachment plate and towing lug combination 20 includes a plate 30 and a towing lug 32. The plate 30 has a central portion 34 including an outer surface 36 and a flange portion 38. The plate 30 may be made of a metal material, such as steel or an aluminum alloy. Alternatively, the plate 30 may be made of a reinforced or unreinforced nonmetal material. The towing lug 32 is attached to the central portion 34 of the plate 30 and extends from the outer surface 36 of the central portion 34 of the plate 30. The towing lug 32 may be attached in the center of the central portion 34 of the plate 30 or at any other location in the central portion 34 of the plate 30. The towing lug 32 may be attached to the central portion 34 of the plate 30 via a weld, a mechanical fastener, or any other suitable attachment method.

Figure 6:
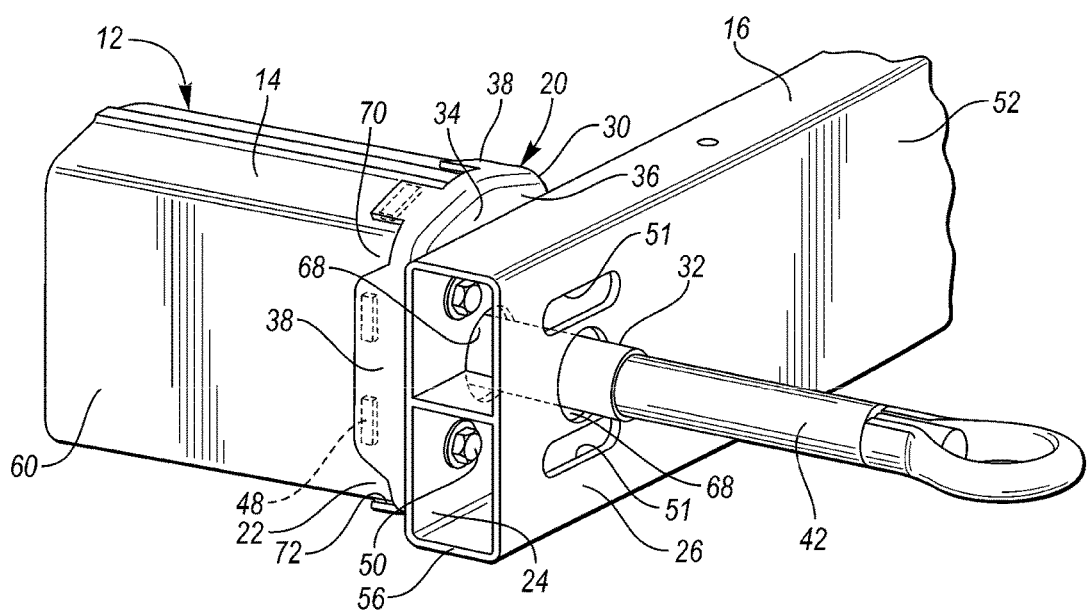
FIG. 6 is a schematic, perspective illustration of the bumper beam attached to the crush can via the attachment plate and towing lug combination of FIG. 1 with a tow hook attached to the attachment plate and towing lug combination.

The towing lug 32 is configured to attach a tow hook 42 to the towing lug 32. The towing lug 32 may be configured with an internal thread 40, as shown, for attaching the tow hook 42 to the towing lug 32, as shown in FIG. 6. The tow hook 42 may be configured with an external thread (not shown) configured to engage the internal thread 40 of the towing lug 32 when the tow hook 42 is attached to the towing lug 32. The tow hook 42 may be attached to the towing lug 32 via engagement of the external thread of the tow hook 42 with the internal thread 40 of the towing lug 32. Alternatively, the tow hook 42 may be attached to the towing lug 32 via any other suitable attachment method. Referring again to FIGS. 4-5, one or more nuts 44 having an internal thread 46 may be attached to the central portion 34 of the plate 30.

Referring now to FIGS. 3 and 6, the flange portion 38 of the plate 30 is attached to the end portion 22 of the crush can 14. The flange portion 38 of the plate 30 may be attached to the end portion 22 of the crush can 14 via an adhesive 48, as shown, via a mechanical fastener (not shown), or via any other suitable attachment method. The central portion 34 of the plate 30 is attached to the first side portion 24 of the bumper beam 16. The central portion 34 of the plate 30 may be attached to the first side portion 24 of the bumper beam 16 via a mechanical fastener 50, as shown in FIG. 6, via an adhesive (not shown), or via any other suitable attachment method. The mechanical fastener 50 may be configured with an external thread (not shown) that engages the internal thread 46 of the nut 44 to attach the central portion 34 of the plate 30 to the first side portion 24 of the bumper beam 16. The second side portion 26 of the bumper beam 16 may form an access hole 51 configured to allow the mechanical fastener 50 to be installed. The access hole 51 may provide clearance for the mechanical fastener 50 and a tool (not shown) used to install the mechanical fastener 50.

The towing lug 32 extends to at least the outer surface 28 of the second side portion 26 of the bumper beam 16 when the flange portion 38 of the plate 30 is attached to the end portion 22 of the crush can 14 and the central portion 34 of the plate 30 is attached to the first side portion 24 of the bumper beam 16.

Referring again to FIG. 2, the bumper beam 16 may be made of a first fiber reinforced polymer or plastic composite material 52 including a plurality of first fibers 54. The plastic material of the first fiber reinforced plastic material 52 may be a thermoset, a thermoplastic, or any other suitable plastic material. The first fiber 54 may be a glass fiber, a carbon fiber, or any other suitable fiber material. The bumper beam 16 may have a first end 56, a second end 58, and a bumper beam axis (axis BA). The bumper beam axis (axis BA) extends from the first end 56 to the second end 58 of the bumper beam 16 and may be coincident with the centroid of a cross section (not shown) of the bumper beam 16. Each of the plurality of first fibers 54 may be aligned parallel to the bumper beam axis (axis BA) of the bumper beam 16 and may extend from the first end 56 to the second end 58 of the bumper beam 16.

The crush can 14 may be made of a second fiber reinforced polymer or plastic composite material 60 including a plurality of second fibers 62. The plastic material of the second fiber reinforced plastic material 60 may be a thermoset, a thermoplastic, or any other suitable plastic material. The second fiber 62 may be a glass fiber, a carbon fiber, or any other suitable fiber material. The crush can 14 may have a first end 64, a second end 66, and a crush can axis (axis CA). The crush can axis (axis CA) extends from the first end 64 to the second end 66 of the crush can 14 and may be coincident with the centroid of a cross section (not shown) of the crush can 14. Each of the plurality of second fibers 62 may be aligned parallel to the crush can axis (axis CA) of the crush can 14 and may extend from the first end 64 to the second end 66 of the crush can 14. The second fiber reinforced plastic composite material 60 may be the same as the first fiber reinforced plastic composite material 52.

Referring again to FIGS. 3 and 6, the bumper beam 16 may have a web 67. The bumper beam 16 may be configured with a passage 68 extending through the bumper beam 16, including through the first side portion 24, through the second side portion 26, and through the web 67, if any. The towing lug 32 may extend through the passage 68 when the flange portion 38 of the plate 30 is attached to the end portion 22 of the crush can 14 and the central portion 34 of the plate 30 is attached to the first side portion 24 of the bumper beam 16.

Referring now to FIGS. 3-6, the end portion 22 of the crush can 14 may have an outer surface 70. The flange portion 38 of the plate 30 may have an inner flange surface 72. The inner flange surface 72 of the flange portion 38 of the plate 30 may be substantially normal to the outer surface 36 of the central portion 34 of the plate 30. The inner flange surface 72 of the flange portion 38 of the plate 30 may be attached to the outer surface 70 of the end portion 22 of the crush can 14 via an adhesive, a mechanical fastener, or any other suitable attachment method.

While the best modes for carrying out the many aspects of the present teachings have been described in detail, those familiar with the art to which these teachings relate will recognize various alternative aspects for practicing the present teachings that are within the scope of the appended claims.

The invention claimed is:
1. An attachment for a vehicle, comprising:
 a plate having a central portion including an outer surface and a flange portion;

a towing lug attached to the central portion of the plate and extending from the outer surface of the central portion of the plate;

a crush can having an end portion; and a bumper beam having a first side portion and a second side portion including an outer surface;

wherein the flange portion of the plate is attachable to the end portion of the crush can;

wherein the central portion of the plate is attachable to the first side portion of the bumper beam; and wherein the towing lug extends to at least the outer surface of the second side portion of the bumper beam when the flange portion of the plate is attached to the end portion of the crush can and the central portion of the plate is attached to the first side portion of the bumper beam;

wherein the bumper beam is made of a first fiber reinforced plastic composite material including a plurality of first fibers.

2. The attachment of claim 1, wherein the bumper beam has a first end, a second end, and an axis; and wherein each of the plurality of first fibers is aligned parallel to the axis of the bumper beam and extends from the first end to the second end of the bumper beam.

3. The attachment of claim 1, wherein the crush can is made of a second fiber reinforced plastic composite material including a plurality of second fibers.

4. The attachment of claim 3, wherein the crush can has a first end, a second end, and an axis; and wherein each of the plurality of second fibers is aligned parallel to the axis of the crush can and extends from the first end to the second end of the crush can.

5. The attachment of claim 4, wherein the bumper beam has a first end, a second end, and an axis; and wherein each of the plurality of first fibers is aligned parallel to the axis of the bumper beam and extends from the first end to the second end of the bumper beam.

6. The attachment of claim 1, wherein the bumper beam is configured with a passage; and wherein the towing lug extends through the passage when the flange portion of the plate is attached to the end portion of the crush can and the central portion of the plate is attached to the first side portion of the bumper beam.

7. The attachment of claim 1, wherein the end portion of the crush can has an outer surface;

wherein the flange portion of the plate has an inner flange surface;

wherein the inner flange surface of the flange portion of the plate is substantially normal to the outer surface of the central portion of the plate; and wherein the inner flange surface of the flange portion of the plate is attachable to the outer surface of the end portion of the crush can.

8. The attachment of claim 1, wherein the central portion of the plate is attachable to the first side portion of the bumper beam via a mechanical fastener.

9. The attachment of claim 8, wherein the mechanical fastener is configured with an external thread;

wherein a nut configured with an internal thread is attached to the central portion of the plate; and wherein the central portion of the plate is attachable to the first side portion of the bumper beam via engagement of the external thread of the mechanical fastener with the internal thread of the nut.

10. The attachment of claim 1, wherein the central portion of the plate is attachable to the first side portion of the bumper beam via an adhesive.

11. The attachment of claim 1, wherein the flange portion of the plate is attachable to the end portion of the crush can via an adhesive.

12. The attachment of claim 1, wherein the flange portion of the plate is attachable to the end portion of the crush can via a mechanical fastener.

13. A vehicle, comprising:
a body structure, including:
a crush can having an end portion;
a bumper beam having a first side portion and a second side portion including an outer surface; and
an attachment plate and towing lug combination, including:
a plate having a central portion including an outer surface and a flange portion; and
a towing lug attached to the central portion of the plate and extending from the outer surface of the central portion of the plate;
wherein the flange portion of the plate is attached to the end portion of the crush can;
wherein the central portion of the plate is attached to the first side portion of the bumper beam; and
wherein the towing lug extends to at least the outer surface of the second side portion of the bumper beam;
wherein the bumper beam is made of a first fiber reinforced plastic composite material including a plurality of first fibers.

14. The vehicle of claim 13, wherein the bumper beam has a first end, a second end, and an axis; and wherein each of the plurality of first fibers is aligned parallel to the axis of the bumper beam and extends from the first end to the second end of the bumper beam.

15. The vehicle of claim 13, wherein the crush can is made of a second fiber reinforced plastic composite material including a plurality of second fibers.

16. The vehicle of claim 15, wherein the crush can has a first end, a second end, and an axis; and wherein each of the plurality of second fibers is aligned parallel to the axis of the crush can and extends from the first end to the second end of the crush can.

17. The vehicle of claim 16, wherein the bumper beam has a first end, a second end, and an axis; and wherein each of the plurality of first fibers is aligned parallel to the axis of the bumper beam and extends from the first end to the second end of the bumper beam.

18. An attachment for a vehicle, comprising:
a plate having a central portion including an outer surface and a flange portion;
a towing lug attached to the central portion of the plate and extending from the outer surface of the central portion of the plate;
a crush can having an end portion; and
a bumper beam having a first side portion and a second side portion including an outer surface;
wherein the bumper beam is made of a first fiber reinforced plastic composite material;
wherein the crush can is made of a second fiber reinforced plastic composite material;
wherein the flange portion of the plate is attachable to the end portion of the crush can;
wherein the central portion of the plate is attachable to the first side portion of the bumper beam; and wherein the towing lug extends to at least the outer surface of the second side portion of the bumper beam when the flange portion of the plate is attached to the end portion of the crush can and the central portion of the plate is attached to the first side portion of the bumper beam.

\* \* \* \* \*